US010203896B2

United States Patent
Yoon et al.

(10) Patent No.: US 10,203,896 B2
(45) Date of Patent: Feb. 12, 2019

(54) METHOD OPERATING UNIVERSAL FLASH STORAGE (UFS) DEVICE, METHOD OPERATING UFS HOST, AND METHOD OPERATING SYSTEM INCLUDING BOTH

(71) Applicant: SAMSUNG ELECTRONICS CO., LTD., Suwon-si, Gyeonggi-do (KR)

(72) Inventors: Song Ho Yoon, Yongin-si (KR); Jeong Hur, Gwangju (KR); Jae Gyu Lee, Suwon-si (KR); Duck Hyun Chang, Seoul (KR); Joo Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 246 days.

(21) Appl. No.: 15/194,714

(22) Filed: Jun. 28, 2016

(65) Prior Publication Data
US 2017/0102893 A1 Apr. 13, 2017

(30) Foreign Application Priority Data
Oct. 13, 2015 (KR) .......................... 10-2015-0142812

(51) Int. Cl.
*G06F 3/06* (2006.01)
*G06F 13/16* (2006.01)

(52) U.S. Cl.
CPC .......... *G06F 3/0632* (2013.01); *G06F 3/0604* (2013.01); *G06F 3/0679* (2013.01); *G06F 13/16* (2013.01)

(58) Field of Classification Search
CPC ..... G06F 3/0604; G06F 3/0679; G06F 3/0632
See application file for complete search history.

(56) References Cited

U.S. PATENT DOCUMENTS

| | | | | |
|---|---|---|---|---|
| 5,594,426 A | * | 1/1997 | Ushijima | ................ H04L 41/06 340/3.1 |
| 5,754,887 A | * | 5/1998 | Damron | .............. G06F 11/0757 710/117 |
| 5,850,556 A | * | 12/1998 | Grivna | .................... G06F 9/461 710/260 |
| 6,055,598 A | * | 4/2000 | Lange | ................. G06F 13/4059 710/100 |
| 6,260,120 B1 | * | 7/2001 | Blumenau | ............. G06F 3/0622 707/999.003 |
| 6,675,243 B1 | * | 1/2004 | Bastiani | .............. G06F 13/4291 710/105 |
| 7,461,299 B2 | | 12/2008 | Rothman et al. | |
| 8,296,467 B2 | | 10/2012 | Lee et al. | |
| 8,402,343 B2 | | 3/2013 | Radulescu | |
| 8,621,128 B2 | | 12/2013 | Radulescu et al. | |

(Continued)

OTHER PUBLICATIONS

UFS v2.1 Improving latency by device initiated Warm Reset.

*Primary Examiner* — Midys Rojas
*Assistant Examiner* — Khoa D Doan
(74) *Attorney, Agent, or Firm* — Volentine, Whitt & Francos, PLLC (57) ABSTRACT

A method of operating a universal flash storage (UFS) device communicating with a UFS host via a link is provided. The method determines in the UFS device whether a warm reset of the link is necessary while the UFS device is communicating with the UFS host via the link. Upon determining that the warm reset of the link is necessary, the UFS device initiates the warm reset of the link.

20 Claims, 11 Drawing Sheets

(56) References Cited

U.S. PATENT DOCUMENTS

| | | | |
|---|---|---|---|
| 8,799,605 B2 | 8/2014 | Hasegawa | |
| 8,843,696 B2 * | 9/2014 | Hasegawa | G06F 13/16 711/100 |
| 8,930,608 B2 * | 1/2015 | Li | G06F 3/0617 710/305 |
| 9,026,854 B2 | 5/2015 | Jeong et al. | |
| 9,921,904 B2 * | 3/2018 | Arroyo | G06F 11/0793 |
| 2005/0149637 A1 | 7/2005 | Fox et al. | |
| 2006/0140122 A1 * | 6/2006 | Shearer | H04L 1/1874 370/236 |
| 2009/0307427 A1 * | 12/2009 | Takasuka | G06F 12/0246 711/115 |
| 2009/0307522 A1 * | 12/2009 | Olson | G06F 11/2007 714/4.1 |
| 2011/0072185 A1 * | 3/2011 | Pinto | G06F 3/0607 710/315 |
| 2011/0185103 A1 * | 7/2011 | Evoy | G06F 13/4282 710/313 |
| 2013/0086282 A1 | 4/2013 | Bajpai et al. | |
| 2013/0145214 A1 * | 6/2013 | Provencher | G06F 11/0754 714/37 |
| 2013/0198423 A1 * | 8/2013 | Sarkar | G06F 13/385 710/74 |
| 2013/0290647 A1 * | 10/2013 | Maeda | G06F 3/0646 711/149 |
| 2014/0043957 A1 * | 2/2014 | Venkatraman | H04L 41/0672 370/216 |
| 2014/0365832 A1 * | 12/2014 | Neeb | G06F 13/1673 714/43 |
| 2015/0012671 A1 * | 1/2015 | Park | G06F 1/3268 710/5 |
| 2015/0032913 A1 * | 1/2015 | Kim | G06F 13/28 710/24 |
| 2017/0091132 A1 * | 3/2017 | Cardinell | G06F 13/385 |

\* cited by examiner

TABLE

| Reset Type | Initiator | Current Power Mode | Power Mode after Reset | | Boot Process[2] |
|---|---|---|---|---|---|
| | | | bInitPowerMode = 00h | bInitPowerMode = 01h | |
| Power-on | Host | Any | Sleep[1] | Active | Enabled |
| HW Reset | Host | Any | Sleep[1] | Active | Enabled |
| EndPointReset | Host | Any | Sleep[1] | Active | Enabled |
| LU Reset | Host | Active or Idle | Maintain the current power mode | Maintain the current power mode | Disabled |
| UniPro Warm Reset | Host /Device | Any | Sleep[1] | Active | Enabled |

NOTE 1 At the end of the device initialization, the power mode transitions from Active to Pre-Sleep and then Sleep (after an implementation specific time).

NOTE 2 The column "Boot process" shows after which type of reset the system can execute the boot process as described in 13.1 "UFS Boot". The boot process is enabled if the reset event restores the UFS device to the default state: all parameters are set to the default value, queue are empty, etc.

METHOD OPERATING UNIVERSAL FLASH STORAGE (UFS) DEVICE, METHOD OPERATING UFS HOST, AND METHOD OPERATING SYSTEM INCLUDING BOTH

CROSS-REFERENCE TO RELATED APPLICATION

This application claims priority under 35 U.S.C. § 119(a) from Korean Patent Application No. 10-2015-0142812 filed on Oct. 13, 2015, the disclosure of which is hereby incorporated by reference in its entirety.

BACKGROUND

Embodiments of the inventive concept relate to methods of operating a universal flash storage (UFS) device, and more particularly, to methods of operating a UFS device capable of triggering a warm reset of a link. Embodiments of the inventive concept also relate to methods of operating a UFS host and methods of operating a UFS system including a UFS device and a UFS host.

A UFS host and UFS device send and/or receive (hereafter, "communicate") data with each other via a link. The combination of UFS device, UFS host and connecting link may be termed a UFS system. Within a UFS system, a link may be variously established between the UFS device and UFS host using one or more signal(s) communication technologies (e.g., hardwired, wireless, radio frequency (RF), infrared (IR), etc.).

Circumstances routinely arise wherein communication between a UFS host and UFS device via an established link fails. For example, assuming that a UFS write command is being processed by the UFS device when a link failure occurs, the UFS device will be unable to transmit a corresponding write command completion response (i.e., a message indicating successful completion of the write command) to the UFS host. In response to the failure to receive a write command completion response, a UFS driver in the UFS host will wait for a predetermined time-out period. Following expiration of the time-out period, the UFS host determines that a time-out error has occurred. Thereafter, the UFS driver may transmit a write command fail indication to (e.g.) an application indicating that execution of the write command has failed. As a result, some corrective action is usually necessary and may be taken by the application, the UFS driver, or elsewhere in the UFS system. Until such corrective action is taken, the UFS system cannot operate normally even with restoration of the link.

SUMMARY

According to some embodiments of the inventive concept, there is provided a method of operating a universal flash storage (UFS) device configured to communicate with a UFS host via a link. The method includes; determining in the UFS device whether a warm reset of the link is necessary, upon determining that the warm reset of the link is necessary, using the UFS device to initiate the warm reset, and performing a warm reset of the link.

In another embodiment, the inventive concept provides a method of operating a universal flash storage (UFS) host including UFS driver, a command queue, and a UFS host controller communicating with a UFS device via a link. The method includes; transmitting a first write command indicating a first write operation to the UFS device, transmitting a second write command indicating a second write operation to the UFS device, receiving a first completion response from the UFS device upon completion of the first write operation, receiving a second completion response from the UFS device upon completion of the second write operation, and performing a warm reset of the link in response to a determination by the UFS device, wherein the warm reset of the link is performed between receiving the first completion response and receiving the second completion response.

In another embodiment, the inventive concept provides a method of operating a universal flash storage (UFS) system including a UFS device communicating with a UFS host via a link. The method includes; generating a first command indicating a first operation and a second command indicating a second operation in the UFS host in response to an input/output request, storing the first command together with a first flag, and storing the second command together with a second flag in a command queue of the UFS host, transmitting the first command and second command from the UFS host to the UFS device, executing the first operation in the UFS device in response to the first command, and executing the second operation in the UFS device in response to the second command, determining in the UFS device whether a warm reset of the link is necessary; and upon determining that the warm reset of the link is necessary, initiating the warm reset of the link in the UFS device.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

Embodiments of the inventive concept now will be described in some additional detail with reference to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the written description and drawings, like reference numbers and labels are used to denote like or similar elements and features.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Background information related to the subject inventive concept may be obtained by review of published JEDEC standards document JESD220B which may be found at jedec.org/standards-documents/result/JESD220B. Those skilled in the art will recognize that JEDEC is an international standards setting body for a variety of semiconductor and electronics devices and systems. The particular standard noted above is related to universal flash storage (UFS) version 2.0. The description that follows assumes a familiarity with the concepts and terms of this publicly available technical specification.

Figure 1:
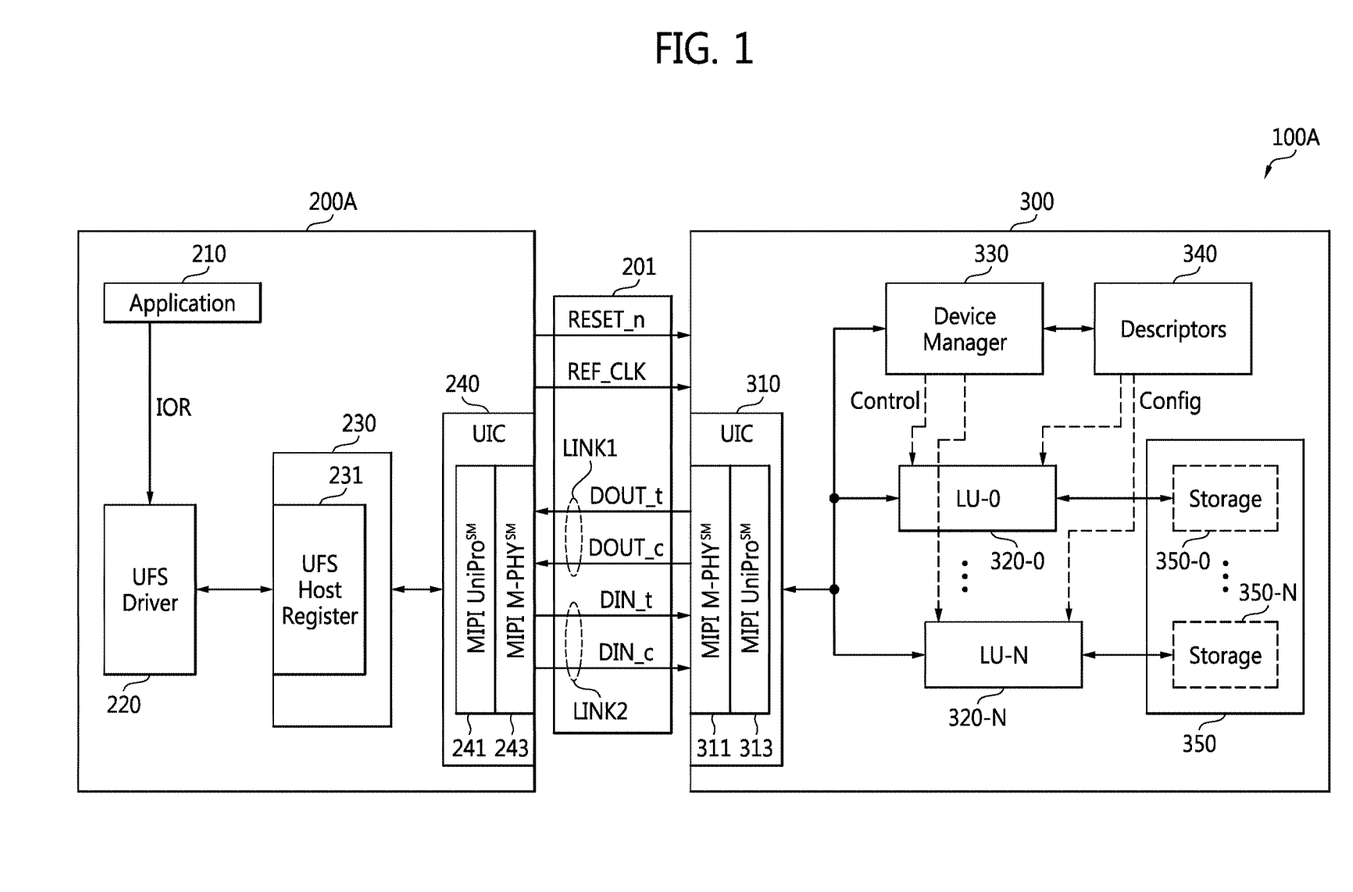
FIG. 1 is a block diagram of a universal flash storage (UFS) system according to some embodiments of the inventive concept.

Figure (FIG.) 1 is a block diagram of a UFS system 100A according to some embodiments of the inventive concept. The UFS system 100A includes a UFS host 200A and a UFS device 300 connected via a link established as a UFS interface 201. When the UFS device 300 cannot communicate signals with the UFS host 200A via the UFS interface 201, the UFS device 300 may initiate a UniPro[SM] Warm Reset. In this context, the term "UniPro Warm Reset" denotes one or more procedures specified by agreement of the Mobile Industry Processor Interface (MIPI®) Alliance in conjunction with JEDEC and the published technical standard noted above. As will be appreciated by those skilled in the art, the term "UniPro Warm Reset" is deemed a term of art within the subject specification.

The UFS host 200A may include an application 210, a UFS driver 220, a UFS host controller 230, and a UFS interconnect (UIC) layer 240. The application 210 may be a program (or a software) that requests (or initiates) communication with the UFS device 300. The application 210 may communicate with the UFS device 300 using the UFS driver 220. The application 210 may transmit an input/output request (IOR) provoking the input and/or output of data by the UFS device 300 with respect to the UFS driver 220. Thus, an input/output request may be a read request, a write request, or a discard request but is not restricted thereto.

The UFS driver 220 may manage the UFS host controller 230 using UFS host controller interface (UFS-HCI). The UFS-HCI may include a set of registers 231 exposed to the UFS host controller 230. For example, the register set 231 may be used as a command queue storing at least one command. The UFS driver 220 may convert an input/output request generated by the application 210 into at least one UFS command defined in the UFS specification (JESD220B) and may output the at least one UFS command to the UFS host controller 230.

The UFS host controller 230 may transmit the at least one UFS command to a UIC layer 310 of the UFS device 300 via the UIC layer 240 and UFS interface 201. The UFS interface 201 may be physically connected between the UFS host 200A and the UFS device 300.

The UIC layer 240 illustrated in FIG. 1 includes a MIPI UniPro 241 and a MIPI M-PHY[SM] 243. The UIC layer 310 may include a MIPI M-PHY 311 and a MIPI UniPro 313. The MIPI M-PHY 243 and the MIPI M-PHY 311 each may be a differential, dual simplex physical layer including transmit and receive line pairs.

The UFS interface 201 may support multiple lanes, each of which may be a differential pair. The basic configuration is based on a single transmit lane and a single receive lane. The UFS interface 201 may include a line transmitting a reference clock (REF_CLK), a line transmitting a hardware reset signal (RESET_n) to the UFS device 300, lines transmitting a pair of differential input signals (DIN_t and DIN_c), and lines transmitting a pair of differential output signals (DOUT_t and DOUT_c). For example, the lines used to transmit the pair of the differential output signals DOUT_t and DOUT_c may be referred to as a first link (LINK1) and the lines used to transmit the pair of the differential input signals DIN_t and DIN_c may be referred to as a second link (LINK2). Thus, in certain embodiments of the inventive concept, the UFS system link will include the UFS interface 201, and may include one or more signal link(s) like the first link LINK1 and/or the second link LINK2.

The UFS device 300 may perform an input/output operation according to the at least one UFS command, and in response, may transmit a completion response to the UFS host 200A when the input/output operation is completed. The UFS device 300 may be implemented as a memory card, a group of embedded bootable mass storage devices, or a group of input/output devices. The UFS device 300 may include a plurality of logic units 320-0 through 320-N, a device manager 330, descriptors 340, and a plurality of memory devices 350-0 through 350-N.

Each of the memory devices 350-0 through 350-N may include a memory cell array and a control circuit which controls the operation of the memory cell array. The memory cell array may include a two-dimensional (2D) memory cell array or a three-dimensional (3D) memory cell array. The 2D or 3D memory cell array may include a plurality of memory cells, each of which may store information of one bit or information of at least two bits.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the present inventive concept, the 3D memory array includes vertical NAND strings that are vertically oriented such that at least one memory cell is located over another memory cell. The at least one memory cell may comprise a charge trap layer. The following U.S. Patent documents, which are hereby collectively incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and published U.S. Patent Application No. 2011/0233648.

For example, the UFS device controller may include the logic units 320-0 through 320-N, the device manager 330, and the descriptors 340. For example, the UFS device 300 may include eight logic units. The logic unit is an internal entity of a bus device which performs a certain function and addresses a particular space or configuration in the bus device.

The device manager 330 may perform a device-level function such as power management on the logic units 320-0 through 320-N while the logic units 320-0 through 320-N are performing a function such as reading or writing on the memory devices 350-0 through 350-N, respectively. The descriptors 340 refer to the storage of configuration related to the information of each of the logic units 320-0 through 320-N.

Figure 2:
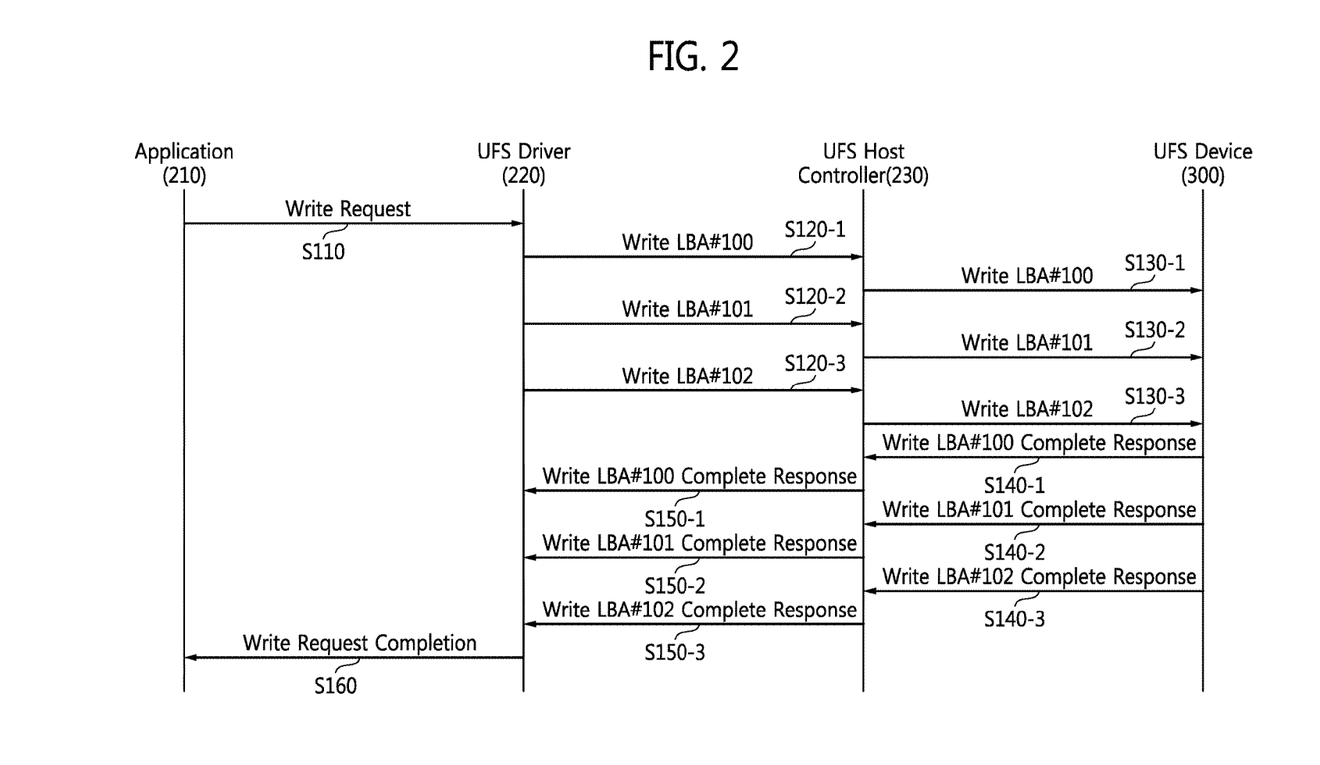
FIG. 2 is a flowchart of the operation of the UFS system illustrated in FIG. 1.

FIG. 2 is an operational flowchart diagram further illustrating the operation of the UFS system 100A of FIG. 1. FIG. 2 illustrates an exemplary normal input/output operation sequence.

Referring to FIGS. 1 and 2, the application 210 may transmit a write request to the UFS driver 220 (S110). The UFS driver 220 may divide the write request into a plurality of UFS write commands.

Each of the UFS write commands may include a start address of a memory area defined by the memory devices 350-0 through 350-N included in the UFS device 300, the size of write data, and the position of a logic unit. In certain embodiments of the inventive concept, each of the UFS write commands may be defined as a command including write data. Thus, a write command may integrally include write data in certain embodiments of the inventive concept, but it will be construed that the write command and the write data can be separated from each other.

When the size of write data requested by the UFS host 200A (or more particularly by the application 220) using the write command, is greater than a unit data process size defined by the UFS device 300, the UFS driver 220 may accordingly divide the write request into a plurality of UFS write commands. The size(s) of data included in the UFS write command(s) or corresponding write data to be processed according to the UFS write command(s) may be the same or different from one another.

Thus, in the illustrated example of FIG. 2, the UFS driver 220 is assumed to sequentially transmit UFS write commands (e.g., Write LBA#100, Write LBA#101, and Write LBA#102) to the UFS host controller 230 (S120-1, S120-2, and S120-3).

Thereafter, the UFS host controller 230 may sequentially transmit the UFS write commands (Write LBA#100, Write LBA#101, and Write LBA#102) to the UIC layer 310 through the UIC layer 240 and via the link 201 in three corresponding operations (S130-1, S130-2, and S130-3).

The UFS device 300 may process the UFS write commands (Write LBA#100, Write LBA#101, and Write LBA#102) and accordingly transmit corresponding completion responses (Write LBA#100 Complete Response, Write LBA#101 Complete Response, and Write LBA#102 Complete Response) respectively associated with the UFS write commands (Write LBA#100, Write LBA#101, and Write LBA#102) following completion (i.e., their successful processing by the UIC layer 240, UIC layer 310 and link 201) (S140-1, S140-2, and S140-3).

The UFS host controller 230 may then transmit the completion responses (Write LBA#100 Complete Response, Write LBA#101 Complete Response, and Write LBA#102 Complete Response) from the UIC layer 240 to the UFS driver 220 (S150-1, S150-2, and S150-3). Upon receiving all the completion responses (Write LBA#100 Complete Response, Write LBA#101 Complete Response, and Write LBA#102 Complete Response), the UFS driver 220 may transmit a write request completion to the application 210 (S160).

Figure 3:
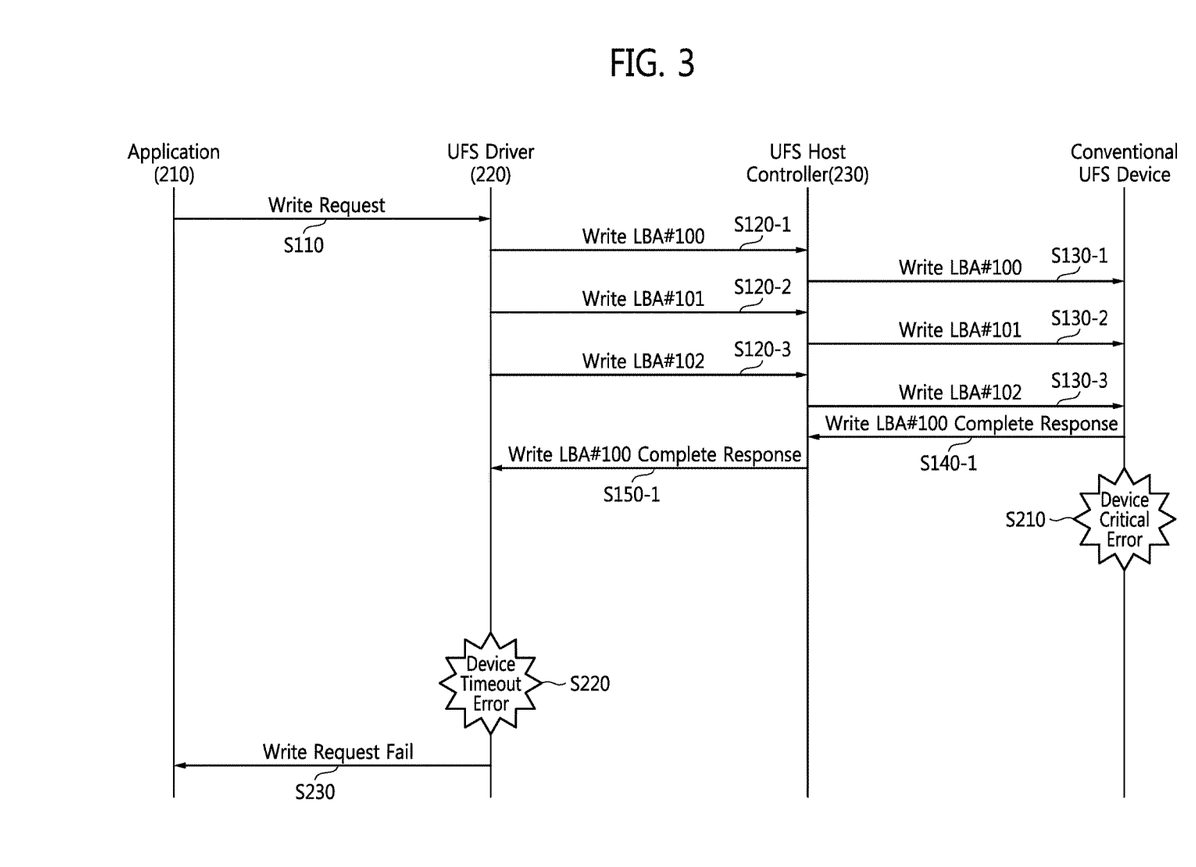
FIG. 3 is a flowchart of the operation of a conventional UFS system when an error occurs in a UFS device included in the conventional UFS system.

FIG. 3 is another operational flowchart diagram further illustrating the operation of the UFS system 100A of FIG. 1. However, in contrast to the operational flowchart of FIG. 2, FIG. 3 illustrates the failure response of a conventional UFS system to an operational error that occurs in a UFS device included in the conventional UFS system.

Referring to FIGS. 2 and 3, the UFS device illustrated in FIG. 3 is unable to initiate a warm reset, unlike a UFS device consistent with embodiments of the inventive concept (e.g., the UFS device 300 described with reference to FIG. 4). In other words, the conventional UFS device cannot be used to initiate any type of warm reset, and in particular, may not be used to initiate a UniPro Warm Reset.

Referring to FIG. 3, when an error (e.g., a device critical error) occurs while the UFS write command(s) (Write LBA#101 or Write LBA#102) is being processed (S210), the UFS device is accordingly not able to transmit the corresponding completion response(s) (Write LBA#101 Complete Response or Write LBA#102 Complete Response) to the UFS host 200A.

The UFS driver 220 of the UFS host 200A waits for the completion response (e.g., Write LBA#101 Complete Response or Write LBA#102 Complete Response) through a predetermined time-out period. When the UFS driver 220 does not receive the completion response, a device time-out error occurs (S220). Accordingly, the UFS driver 220 may transmit a write request fail to the application 210 (S230). At this time, since the write request of the application 210 has not been normally processed, the conventional UFS system including the conventional UFS device cannot operate normally until some error recovery procedure is executed.

The error may include a case where data cannot be normally transmitted or received due to a problem occurring in the MIPI M-PHY 243 and/or the MIPI M-PHY 311, a case where data cannot be normally transmitted or received due to a problem occurring in the link 201, and/or a case where data cannot be transmitted or received via the link 201 due to an excessive number of error bits included in the transmitted data.

Figure 4:
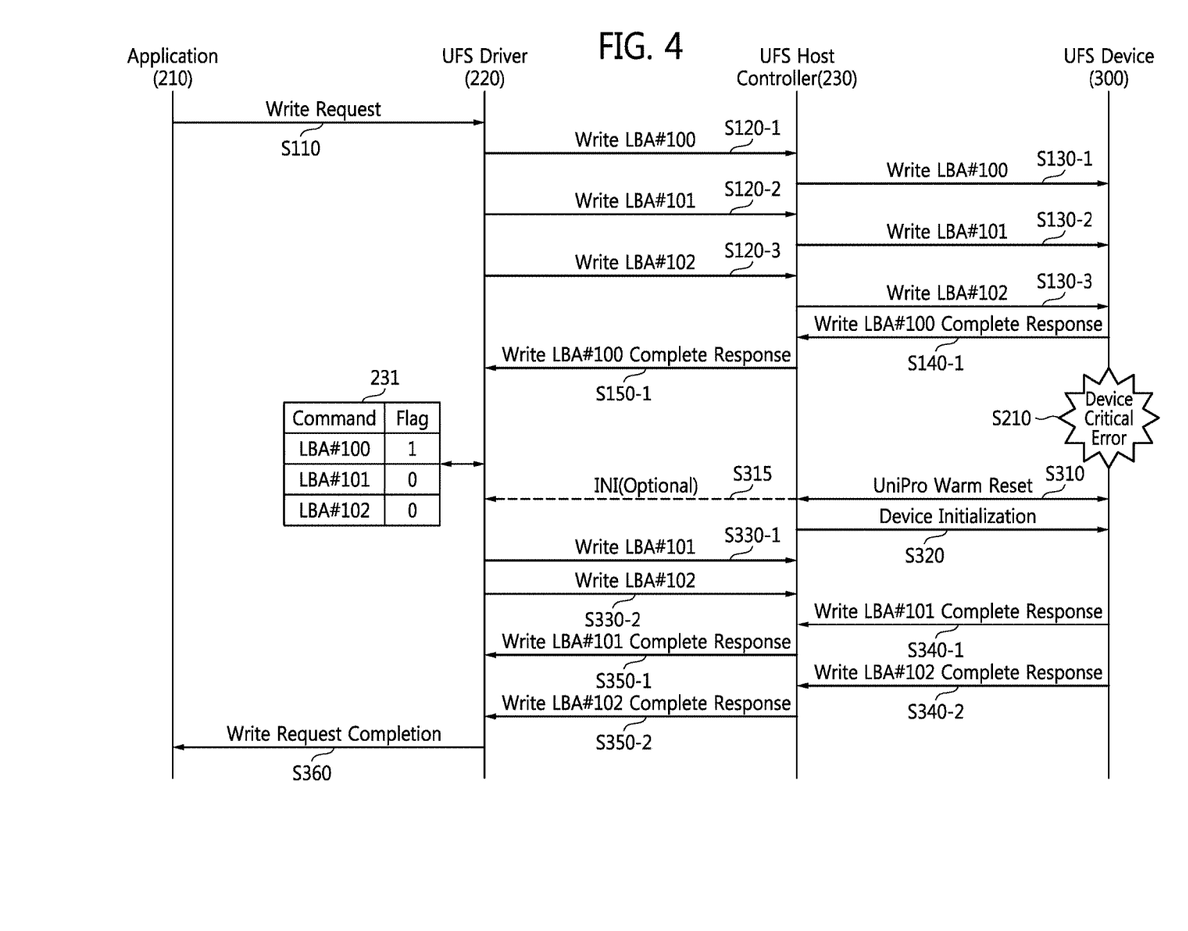
FIG. 4 is a flowchart of the operation of the UFS system illustrated in FIG. 1 when an error occurs in a UFS device illustrated in FIG. 1.

FIG. 4 is still another operational flowchart diagram further illustrating the operation of the UFS system 100A of FIG. 1 according to embodiments of the inventive concept. Here however, in contrast to the operational flowcharts of FIG. 3, when an error occurs in the UFS device 300, a UFS system failure does not arise.

Referring to FIGS. 1, 3, and 4, the UFS driver 220 is assumed to store the UFS write commands (Write LBA#100, Write LBA#101, and Write LBA#102) in the command queue 231. When the processing of a first UFS write command (Write LBA#100) is completed (S130-1), the UFS device 300 transmits a first completion response (Write LBA#100 Complete Response) to the UFS host 200A (S140-1). The UFS host controller 230 may then transmit the first completion response (Write LBA#100 Complete Response) to the UFS driver 220 (S150-1).

Upon receiving the first completion response (Write LBA#100 Complete Response), the UFS driver 220 changes (or updates) a flag associated with the first UFS write command (Write LBA#100) in the command queue 231 (e.g., from a logical 0 to a 1). Here, it is assumed that a '0' flag value indicates that a completion response corresponding to a UFS write command has not been received, while a '1' flag value indicates that the corresponding completion response for a UFS write command has been received.

When an error occurs during the processing of the UFS write command (e.g., Write LBA#101 or Write LBA#102) (S210), the UFS device 300, and more particularly, the UIC layer 310 may determine whether a warm reset (e.g., UniPro Warm Reset) of the link 201 is necessary. When it is determined that the warm reset is necessary; the UFS device 300, and more particularly, the UIC layer 310 may operate as an initiator of the warm reset. In other words, the UFS device 300 may initiate (or trigger) the warm reset.

The UFS host 200A may determine that the warm reset of the link 201 has been triggered by the UFS device 300 and may perform the warm reset, e.g., UniPro Warm Reset, on the UFS device 300 based on the determination result (S310). The UFS device 300 may trigger UniPro Warm Reset by disconnecting a transmit line included in the link 201 from the UFS host 200A and reconnecting the transmit line to the UFS host 200A.

As the warm reset of the UFS device 300 is performed, the UFS device 300 may be initialized (S320). In other words, the link 201 may be reset (S320). The UFS driver 220 may sequentially transmit the UFS write commands (Write LBA#101 and Write LBA#102) to the UFS host controller 230 with reference to the command queue 231 (S330-1 and S330-2). The UFS device 300 may sequentially transmit the UFS write commands (Write LBA#101 and Write LBA#102) to the UFS host controller 230 using the time-out of the completion responses (Write LBA#101 Complete Response and Write LBA#102 Complete Response) to the respective UFS write commands (Write LBA#101 and Write LBA#102) (S330-1 and S330-2).

The UFS host controller 230 may notify a UniPro Warm Reset start (INI) to the UFS driver 220 (S315). The UFS driver 220 may refer to the command queue 231 based on the UniPro Warm Reset start (INI) and sequentially transmit the UFS write commands (Write LBA#101 and Write LBA#102) to the UFS host controller 230 (S330-1 and S330-2). At this time, a flag associated with each of the UFS write commands (Write LBA#101 and Write LBA#102) in the command queue 231 may have a '0' value.

The UFS device 300 may transmit the completion responses (Write LBA#101 Complete Response and Write LBA#102 Complete Response) corresponding to the respective UFS write commands (Write LBA#101 and Write LBA#102) to the UFS host 200A via the link 201 that has been reset in operations S340-1 and S340-2. The UFS host controller 230 may transmit the completion responses (Write LBA#101 Complete Response and Write LBA#102 Complete Response) received from the UIC layer 240 to the UFS driver 220 in operations S350-1 and S350-2. Upon receiving each of the completion responses (Write LBA#101 Complete Response and Write LBA#102 Complete Response), the UFS driver 220 may change the flag corresponding to each of the completion responses (Write LBA#101 Complete Response and Write LBA#102 Complete Response) in the command queue 231 from '0' to '1'.

The UFS driver 220 may determine that the execution of all UFS commands related with the write request has been completed based on the bit values of the flags stored in the command queue 231 and may transmit a write request completion indicating that the write request has been completed to the application 210 (S360).

Thus, even when an error occurs in the UFS device 300 (S210), the UFS device 300 may be used to initiate a UniPro Warm Reset (i.e., may trigger the UFS host 200A to perform the UniPro Warm Reset on the UFS device 300). As the link 201 between the UFS host 200A and the UFS device 300 is reset by the UniPro Warm Reset, the UFS driver 220 can avoid the occurrence of a response time-out. Accordingly, the UFS driver 220 is able to complete a UFS command that has not been processed. As a result, the application 210 can normally and stably complete the write request.

Figure 5:
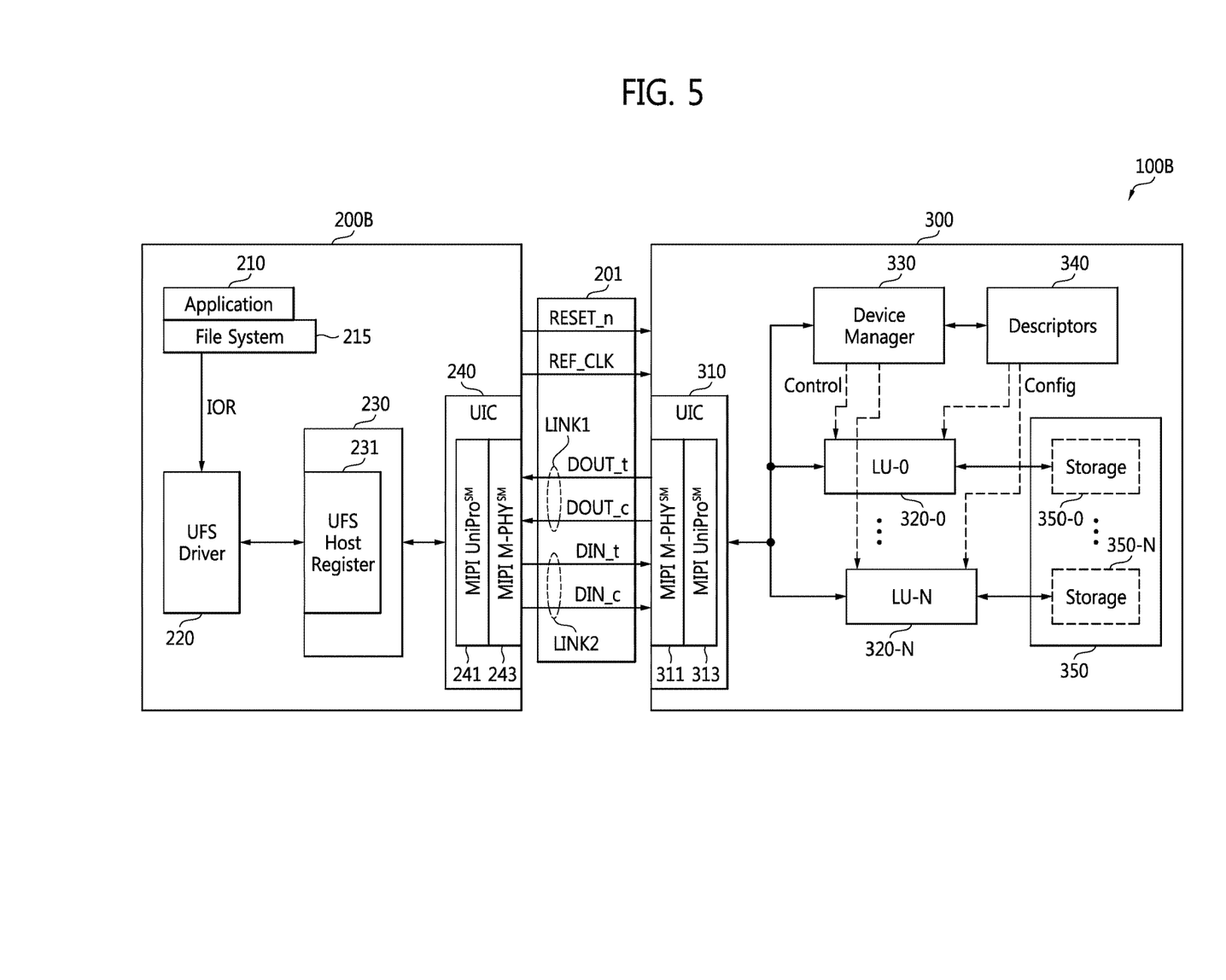
FIG. 5 is a block diagram of a UFS system according to other embodiments of the inventive concept.

FIG. 5 is a block diagram of a UFS system 100B according to other embodiments of the inventive concept. The structure and operation of the UFS system 100B illustrated in FIG. 5 are the same as or similar to those of the UFS system 100A illustrated in FIG. 1, with the exception that a UFS host 200B further includes a file system 215. Here, the file system 215 is responsive to the application in generating data request operations in the form of input/output requests (IOR).

Figure 6:
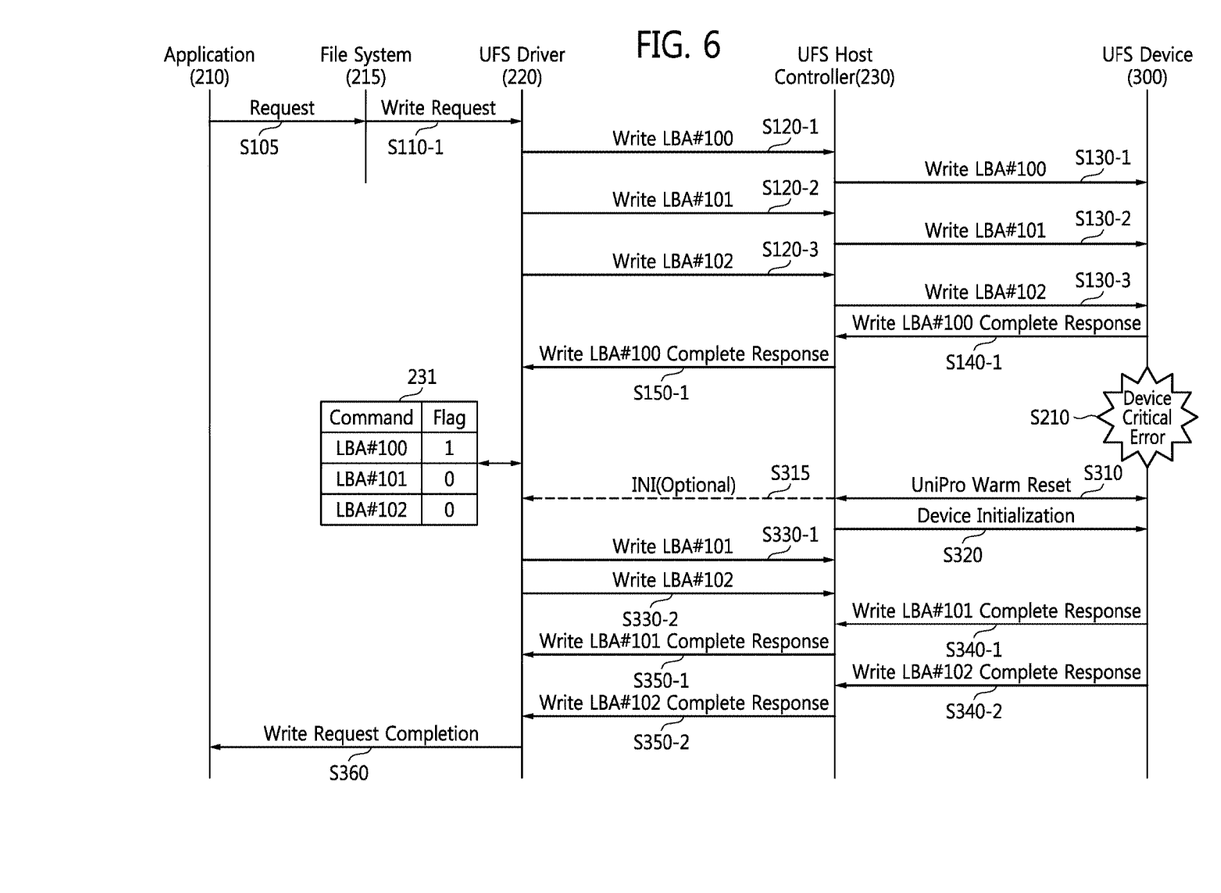
FIG. 6 is a flowchart of the operation of the UFS system illustrated in FIG. 5 when an error occurs in a UFS device illustrated in FIG. 5.

FIG. 6 is an operational flowchart further illustrating the operation of the UFS system 100B of FIG. 5 when an error occurs in the UFS device 300. Referring to FIGS. 4, 5, and 6, the application 210 may transmit a file creation request to the file system 215 for data input/output (S105). The file system 215 may transmit an input/output request (e.g., a write request) to the UFS driver 220 in response to the file creation request (S110-1).

Figure 7:
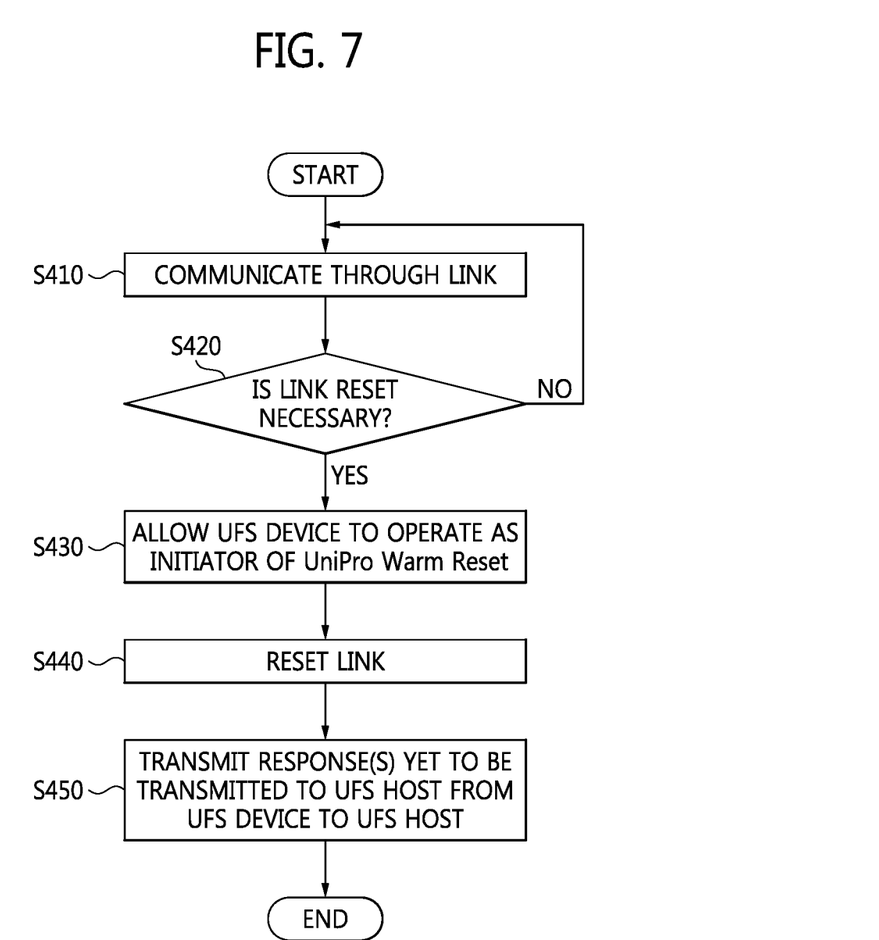
FIG. 7 is a flowchart of a procedure for performing warm reset of a link in the UFS system illustrated in FIG. 1.

FIG. 7 is a flowchart summarizing the operation of performing a warm reset of the link 201 in the UFS system 100A illustrated in FIG. 1. Referring to FIGS. 1 through 7, the UFS host 200A or 200B (collectively denoted by reference numeral 200) may communicate with the UFS device 300 through the link 201 in operation S410. When communication through link 201 is possible, the UFS host 200 may transmit the UFS write commands (Write LBA#100, Write LBA#101, and Write LBA#102) to the UFS device 300 via the link 201 and the UFS device 300 may transmit the completion response (Write LBA#100 Complete Response) to the UFS host 200 through the link 201 (S410).

The UFS device 300 may determine whether a warm reset of the link 201 is necessary (S420). When it is determined that the warm reset is not necessary (S420=NO), the UFS host 200 communicates with the UFS device 300 via the link 201 (S410). However, when it is determined that the warm reset is necessary (S420=YES), the UFS device 300 may operate at the initiator of the warm reset (e.g., UniPro Warm Reset) (S430). The UFS host 200 may determine that the warm reset of the link 201 has been triggered by the UFS device 300 and may reset the link 201 together with the UFS device 300 according to the determination result (S440). In other words, the UFS host 200 may perform the warm reset of the UFS device 300 by handshaking operations with the UFS device 300.

When the link 201 is reset using the warm reset, the UFS device 300 may transmit a response or responses yet to be transmitted to the UFS host 200 to the UFS host 200 through the link 201 that has been reset (S450). As shown in FIGS. 4 and 6, the UFS device 300 can transmit the completion responses (Write LBA#101 Complete Response and Write LBA#102 Complete Response) that have not been transmitted to the UFS host 200 to the UFS host 200 via the link 201 that has been reset in operation S450.

Figure 8:
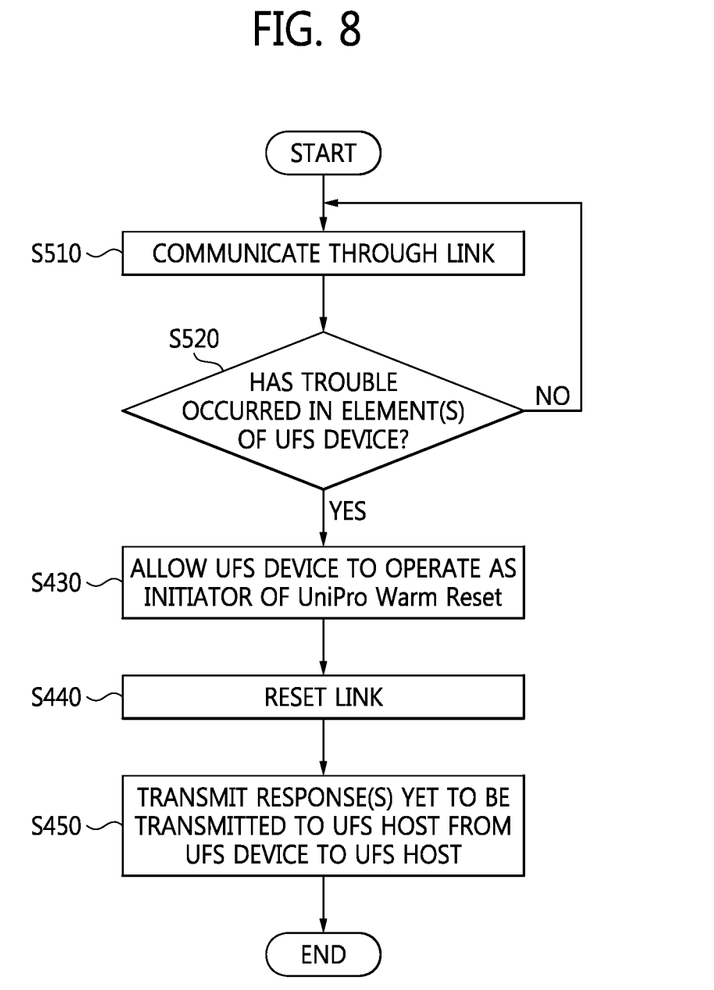
FIG. 8 is a flowchart of a procedure for performing warm reset of a link when an error occurs in the UFS system illustrated in FIG. 1.

FIG. 8 is a flowchart summarizing an operation for performing the warm reset of the link 201 when an error occurs in the UFS system 200 illustrated in FIG. 1. Referring to FIGS. 1 through 6 and FIG. 8, the UFS host 200 may communicate with the UFS device 300 through the link 201 (S510).

The UFS device 300 may determine whether a malfunction or trouble has occurred in at least one element of the UFS device 300 (S520). That is, the UFS device 300 may determine whether the warm reset of the link 201 is necessary due to a malfunction or trouble in its at least one element. When it is determined that the warm reset is not necessary (S520=NO), the UFS host 200 may communicate with the UFS device 300 through the link 201 (S510). However, when it is determined that the warm reset is necessary (S520=YES), the UFS device 300 may operate as an initiator of the warm reset (e.g., a UniPro Warm Reset) (S430). Operations S440 and S450 illustrated in FIG. 8 are the same as operations S440 and S450 illustrated in FIG. 7.

Figure 9:
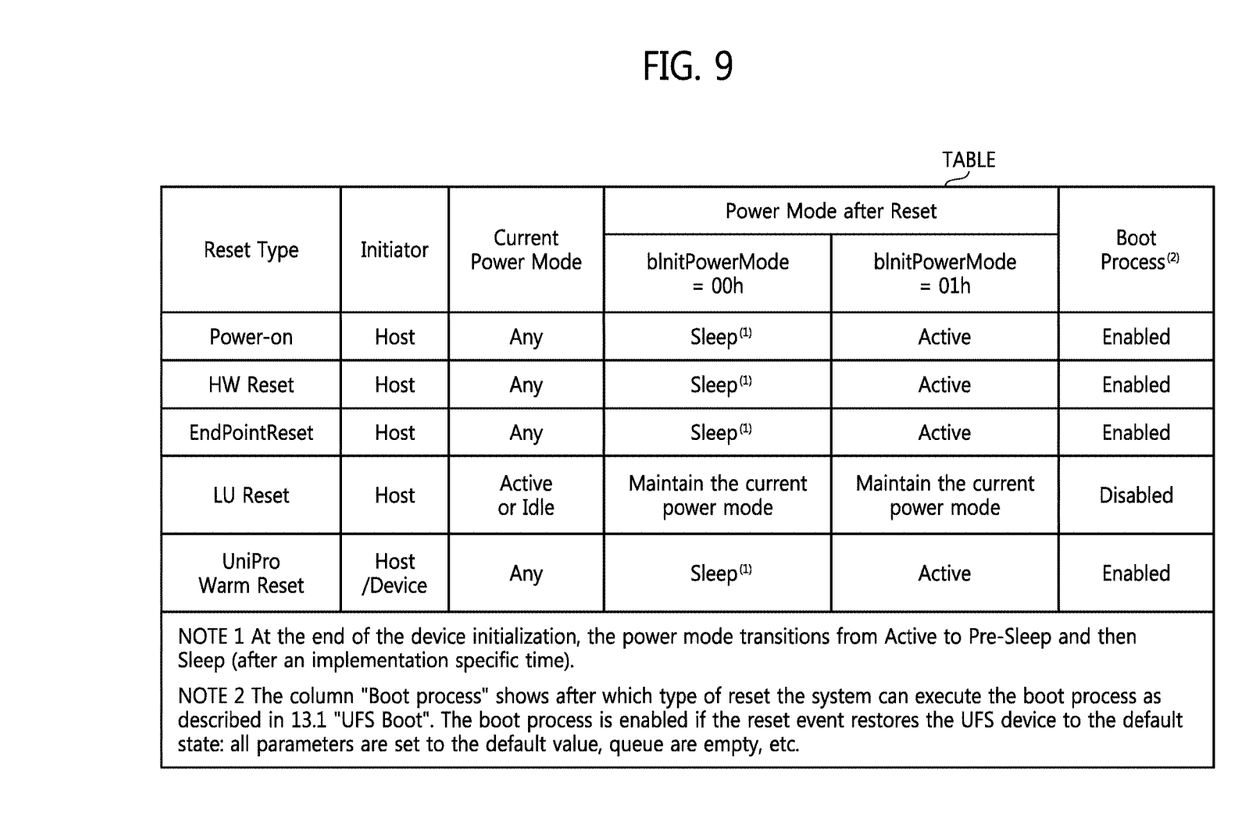
FIG. 9 is a table showing the reset states of the UFS system illustrated in FIG. 1.

FIG. 9 is a table listing the reset states for the UFS system 100A of FIG. 1. Referring to FIG. 9, an initiator of the UniPro Warm Reset may be the UFS host 200 or the UFS device 300. In other words, with the exception that the initiator of the UniPro Warm Reset is either the UFS host 200 or the UFS device 300, the table illustrated in FIG. 9 is the same as Table 7.2—Reset States defined in JESD220B. Therefore, the detailed descriptions of the table illustrated in FIG. 9 will be omitted.

Figure 10:
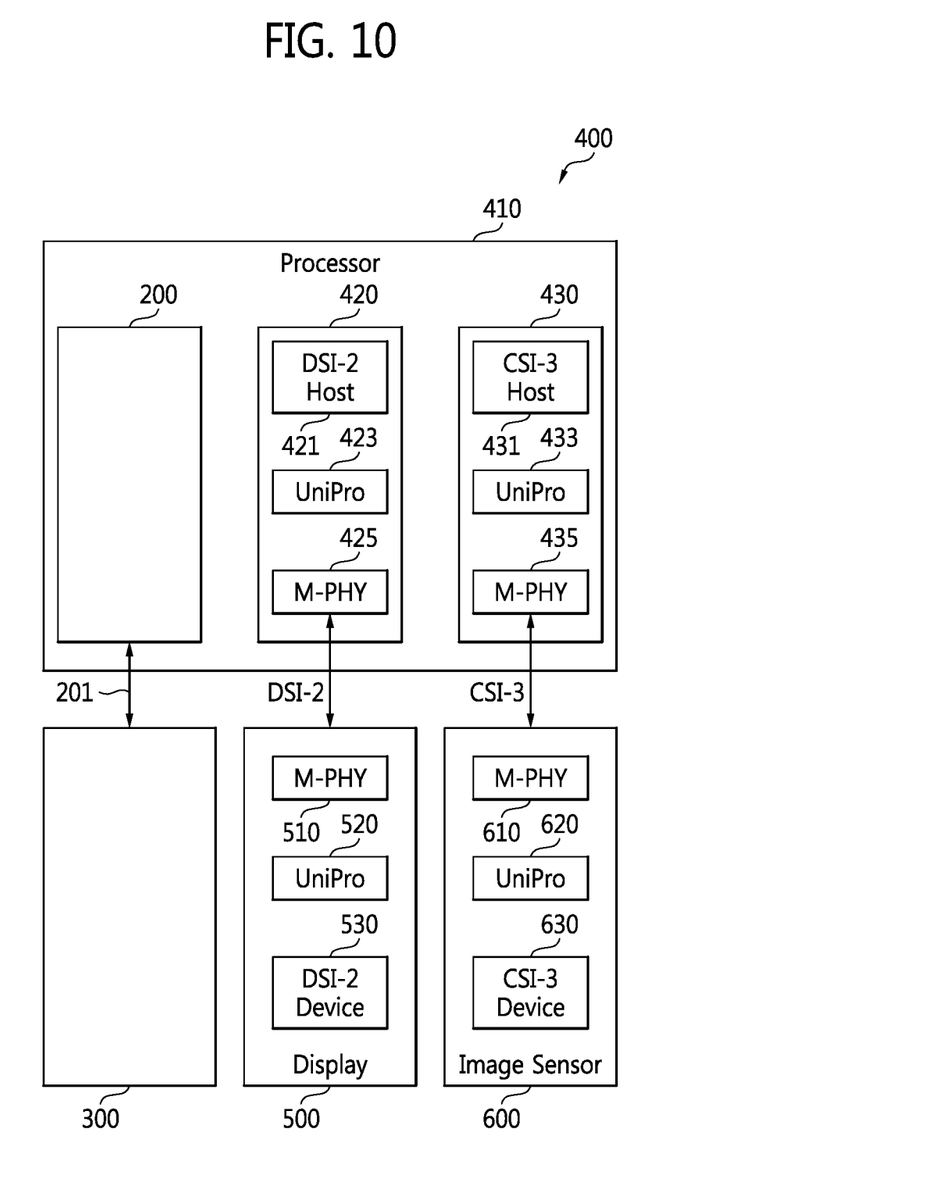
FIG. 10 is a block diagram of a UFS system according to still other embodiments of the inventive concept.

FIG. 10 is a block diagram of a UFS system 400 according to still other embodiments of the inventive concept. Referring to FIGS. 1 through 10, the UFS system 400, e.g., a data processing system, may be implemented as a mobile device. The UFS system 400 may include a processor 410, the UFS device 300, a display 500, and an image sensor 600. The UFS system 400 may be implemented as a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or a drone.

The processor 410 may control the UFS device 300, the display 500, and the image sensor 600. The processor 410 may be implemented as an integrated circuit (IC), a system on chip (SoC), an application processor (AP), a mobile AP, a chipset, or a group of chips. The processor 410 may include UFS hosts 200, 420, and 430.

The host 420 may communicate data with the display 500 through a display serial interface (DSI)-2. The host 420 may include a DSI-2 host 421, a link layer 423 such as mobile industry processor interface (MIPI) UniPro, and a physical layer 425 such as MIPI M-PHY.

The display 500 may include a MIPI M-PHY 510, UniPro 520, and a DSI-2 device 530. The MIPI M-PHY 510 may control data transmission between the DSI-2 and the UniPro 520. The UniPro 520 may control data transmission between the MIPI M-PHY 510 and the DSI-2 device 530. The DSI-2 device 530 may be a display panel. The display panel may be a thin film transistor-liquid crystal display (TFT-LCD) panel, a light emitting diode (LED) display panel, an organic LED (OLED) display panel, an active-matrix OLED (AMOLED) display panel, or a flexible display panel.

The host 430 may communicate data with the image sensor 600 through camera serial interface (CSI)-3. The host 430 may include a CSI-3 host 431, a link layer 433 such as MIPI UniPro, and a physical layer 435 such as MIPI M-PHY.

The image sensor 600 may include a MIPI M-PHY 610, UniPro 620, and a CSI-3 device 630. The MIPI M-PHY 610 may control data transmission between the CSI-3 and the UniPro 620. The UniPro 620 may control data transmission between the MIPI M-PHY 610 and the CSI-3 device 630. The CSI-3 device 630 may include a pixel array and peripheral circuits which process pixel signals output from the pixel array.

Figure 11:
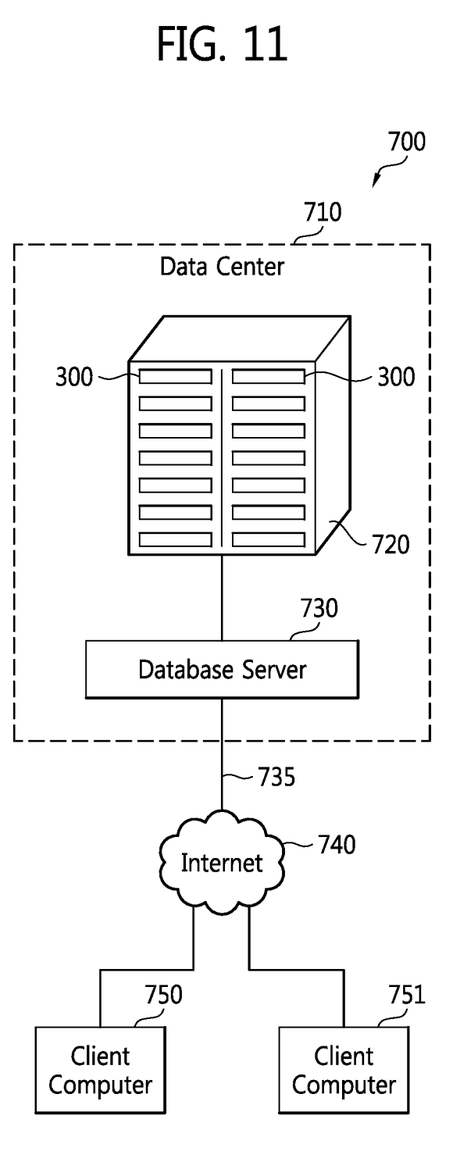
FIG. 11 is a block diagram of a UFS system according to further embodiments of the inventive concept.

FIG. 11 is a block diagram of a UFS system 700 according to further embodiments of the inventive concept. Referring to FIGS. 1 through 9 and FIG. 11, the UFS system 700, e.g., a data processing system, may include a database 720, a database server 730, a second network 740, and a plurality of client computers 750 and 751. The database 720 and the database server 730 may be included in a data center 710. The data center 710 may be an internet data center or a cloud data center.

The database 720 may include a plurality of UFS devices 300. The database server 730 may control the operations of each of the UFS devices 300. The database server 730 may be connected to the second network 740, e.g. an internet or Wi-Fi, via a first network 735, e.g. a local area network (LAN). The database server 730 may be a web server or a mail server but is not restricted thereto. The database server 730 may perform the functions of the UFS host 200. The client computers 750 and 751 may be connected to the database server 730 via the second network 740.

As described above, according to certain embodiments of the inventive concept, a UFS device is able to operate as an initiator of the reset of a link between a UFS host and the UFS device. The UFS device triggers the UFS host to perform UniPro Warm Reset on the UFS device even when an error occurs in the UFS device. As the link between the UFS host and the UFS device is reset using the UniPro Warm Reset, a UFS driver of the UFS host can avoid the occurrence of time-out. Accordingly, the UFS driver can complete a UFS command that has not been processed. As a result, an application of the UFS host can normally and stably complete a write request.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating a universal flash storage (UFS) device including a UFS interconnect (UIC) layer and communicating with a UFS host via a link, the method comprising:

determining in the UFS device using the UIC layer whether a warm reset of the link is necessary;

upon determining that the warm reset of the link is necessary, using the UFS device to initiate the warm reset; and performing the warm reset of the link.

2. The method of claim 1, wherein the determining of whether a warm reset of the link is necessary is based on a number of error bits in data received via the link while the UFS device is communicating with the UFS host via the link.

3. The method of claim 1, wherein the warm reset is UniPro Warm Reset.

4. The method of claim 2, wherein the communicating of the UFS device with the UFS host via the link comprises;
receiving a first command indicating a first operation and a second command indicating a second operation from the UFS host;
executing the first operation and executing the second operation in the UFS device;
transmitting a first completion response to the UFS host in response to completion of the first operation; and
transmitting a second completion response to the UFS host in response to completion of the second operation,
wherein the warm reset of the link occurs between the transmitting of the first completion response and the transmitting of the second completion response.

5. The method of claim 1, wherein the performing of the warm reset of the link comprises initiating handshaking operations between the UFS device and UFS host.

6. The method of claim 5, further comprising:
transmitting a completion response corresponding to an operation executed by the UFS device after performing the warm reset of the link.

7. The method of claim 1, wherein the UIC layer is one of a differential layer including at least one transmit and receive line pair, or a dual simplex physical layer including at least one transmit and receive line pair.

8. A method of operating a universal flash storage (UFS) host including UFS driver, a command queue, and a UFS host controller communicating via a link with a UFS device including a UFS interconnect (UIC) layer, the method comprising:
transmitting a first write command indicating a first write operation to the UFS device;
transmitting a second write command indicating a second write operation to the UFS device;
receiving a first completion response from the UFS device upon completion of the first write operation;
receiving a second completion response from the UFS device upon completion of the second write operation; and
performing a warm reset of the link in response to a determination made by the UIC layer of the UFS device, wherein the warm reset of the link is performed between receiving the first completion response and receiving the second completion response.

9. The method of claim 8, further comprising:
receiving a write request in the UFS driver;
storing the first write command and second write command in the command queue in response to the write request.

10. The method of claim 9, wherein the write request originates in an application running on the UFS host or a file system running on the UFS host.

11. The method of claim 8, further comprising:
using the UFS host controller to indicate initiation of the warm reset to the UFS driver in response to the determination by the UFS device.

12. The method of claim 8, wherein the received write request is divided into the first write command and the second write command.

13. The method of claim 8, wherein the UFS host further comprises a second UIC layer, and
the UFS host controller sequentially transmits the first write command and the second write command to the first UIC layer of the UFS device using the second UIC layer.

14. A method of operating a universal flash storage (UFS) system including a UFS device including a first UFS interconnect (UIC) layer and communicating with a UFS host via a link, the method comprising:
generating a first command indicating a first operation and a second command indicating a second operation in the UFS host in response to an input/output request;
storing the first command together with a first flag, and storing the second command together with a second flag in a command queue of the UFS host;
transmitting the first command and second command from the UFS host to the UFS device;
executing the first operation in the UFS device in response to the first command, and executing the second operation in the UFS device in response to the second command;
determining in the UFS device using the first UIC layer whether a warm reset of the link is necessary; and
upon determining that the warm reset of the link is necessary, initiating the warm reset of the link in the UFS device.

15. The method of claim 14, further comprising:
transmitting a first completion response from the UFS device to the UFS host in response to completion of the first operation; and
transmitting a second completion response from the UFS device to the UFS host in response to completion of the second operation,
wherein the warm reset of the link is initiated between the transmitting of the first completion response and the transmitting of the second completion response.

16. The method of claim 15, further comprising:
updating the first flag in the command queue in response to the first completion response; and
querying respective values of the first flag and the second flag in response to the warm reset of the link.

17. The method of claim 16, further comprising:
upon identifying that the first flag has been updated and identifying that the second flag has not been updated, re-transmitting the second command from the UFS host to the UFS device; and
transmitting the second completion response from the UFS device to the UFS host in response to completion of the second operation and the re-transmission of the second command.

18. The method of claim 14, wherein the first command and second command are generated from an input/output request received from an application running on the UFS host or a file system running on the UFS host.

19. The method of claim 14, wherein the determining of whether a warm reset of the link is necessary is based on a number of error bits in data received via the link while the UFS device is communicating with the UFS host via the link.

20. The method of claim 14, wherein the warm reset is UniPro Warm Reset.

* * * * *